May 9, 1961  R. GRÖTZSCHEL ET AL  2,983,185
MOTION PICTURE REFLEX CAMERA
Filed Dec. 14, 1956  2 Sheets-Sheet 1

INVENTORS
RUDOLF GRÖTZSCHEL
HERBERT GOPFERT
WALTER LIEBUSCH
GOTTFRIED STEJSKAL

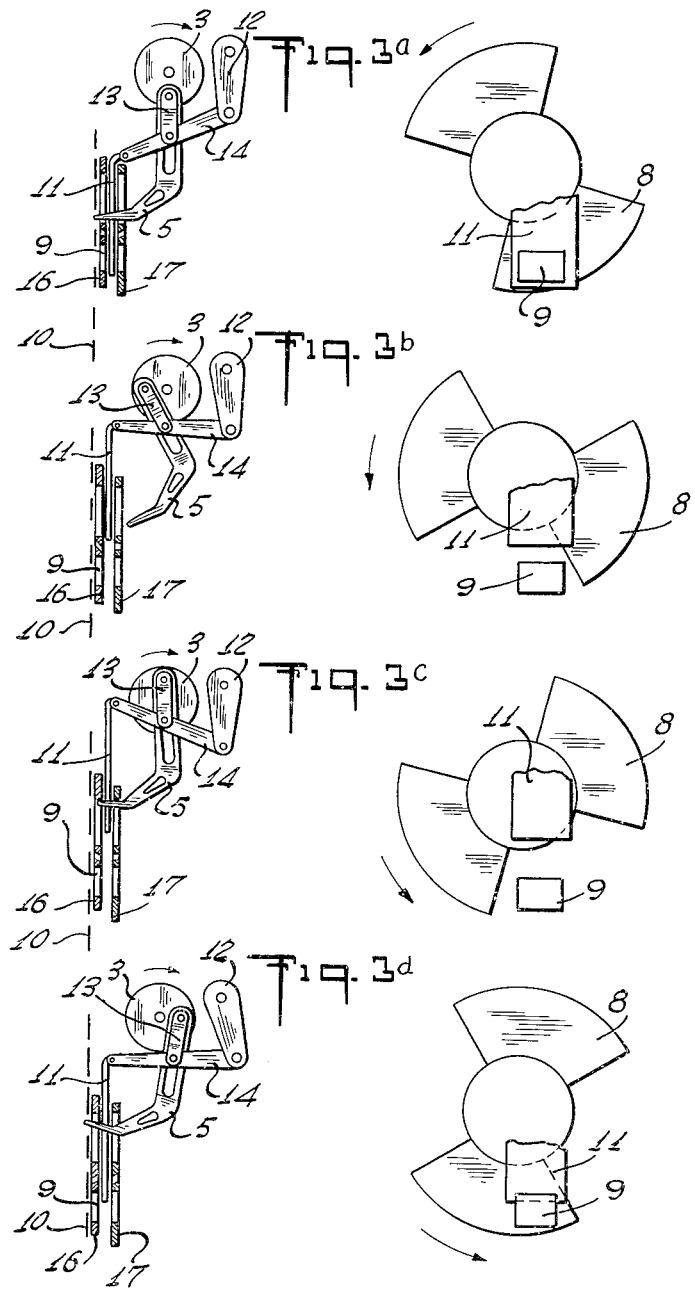

United States Patent Office 2,983,185
Patented May 9, 1961

2,983,185
MOTION PICTURE REFLEX CAMERA

Rudolf Grotzschel, Herbert Gopfert, and Walter Liebusch, Dresden, and Gottfried Stejskal, Meissen, Germany, assignors to VEB Kamera- und Kinowerke Dresden Filed Dec. 14, 1956, Ser. No. 628,405

6 Claims. (Cl. 88—16)

The invention relates to a motion picture reflex camera having a rotating shutter with a reflecting surface.

In conventional cameras of the type mentioned, when the camera is at rest, dispersed light rays entering the camera may strike the film and spoil a number of frames. This is a severe drawback, especially with 16 mm. cameras used frequently for amateur purposes, as it is not intended that the films be edited in each instance. Also in connection with trick exposures, for example slow-motion pictures, particularly where the frames are exposed at relatively long intervals, this drawback is utterly objectionable.

Known devices disclose construction for preventing the entry of harmful light during exposure, but no construction has become known wherein the entry of harmful light between the shutter blades is prevented during the rest position of the shutter.

It is an object of the invention to avoid this drawback of the conventional cameras of this type, and to provide means for rendering motion picture cameras with rotating mirror reflex shutters entirely light-tight during their film gate covering position, which means are also useful for rotating mirror shutters with adjustable closure sectors.

It is another object of the invention to provide, for the indicated purpose, a covering shutter in addition to the rotating mirror shutter and arranged in front of the film gate.

The invention also aims to couple the covering shutter with the film-feeding drive and preferably to construct it as a sliding shutter.

Further objects and details of the invention will be apparent from the description given hereinafter and the accompanying drawings illustrating an embodiment thereof by way of example.

Figure 3 illustrates the invention in the starting or rest position.

Figure 1:
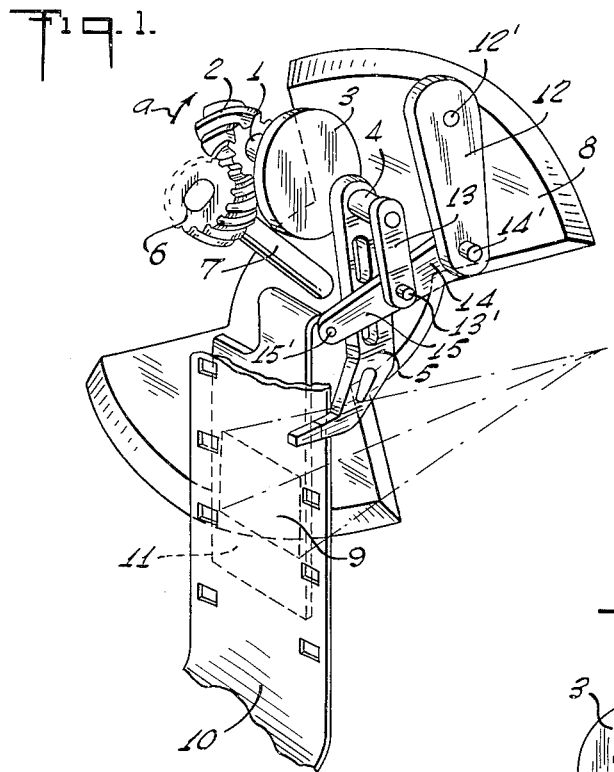
Figure 1 is a perspective view of the invention.
Figure 2:
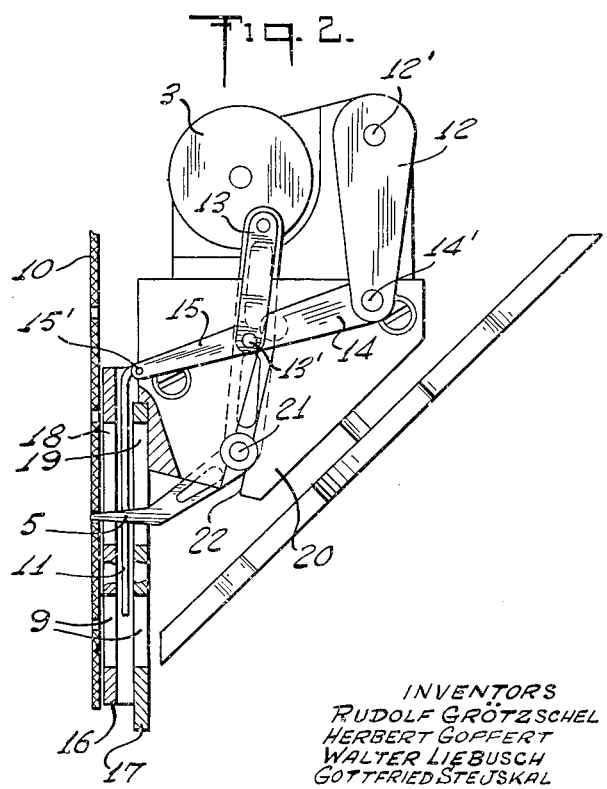
Figure 2 is a sectional view of the invention in a plane parallel to that of the film.

Figures 3b, 3c, and 3d illustrate the invention after drive shaft rotation of 90°, 180° and 270°, respectively.

Referring now to the drawing, shaft 1 is rotatable by means (not shown) in the direction of the arrow a. A worm wheel 2 and a disc 3 are mounted on shaft 1. A crank pin 4 is secured to the disc 3, which drives the claw 5 of the film feeding mechanism. The movement of the claw may be controlled by a cam slot guide of a suitable and well known type, which is not shown in order to avoid an overcrowding of the drawing. Another worm gear 6 meshes with worm gear 2 and drives the mirror shutter 8 via shaft 7 wherein the transmission ratio of the gears 2 and 6 is 1 to 2. The film 10 moves in the rear of the gate 9 provided in a wall (not shown). In front of the gate a sliding shutter 11 is located which is guided in the housing by means not shown. Now we have found that in order for the mechanism to function properly it is necessary that the movements of the claw and the sliding shutter operate according to different functions of distance with respect to time, as it will be explained hereinafter so that the time exposure of the film is in no way affected by the slide shutter. During one revolution of the shaft or the eccentric driving the claw, the latter effects a working stroke during which the film is advanced, and an idling stroke during which the film rests in the frame gate and an exposure is made. For each of the working and idling strokes a time interval is required which corresponds to a rotation of the claw-driving shaft 1 through about 180 degrees. However, the sliding shutter cannot require a time interval corresponding to 180 degrees of a rotation of the claw-driving shaft for each of its movements to uncover and to cover the film gate, since no other time interval would be available for completely uncovering the film gate during the exposure. Consequently, the opening of the sliding shutter should take place at the start of the idling stroke of the claw at which time the rotating shutter has not yet cleared the film gate, while the closing movement of the sliding shutter should take place during the working stroke of the claw at a time when the rotating shutter already covers the film gate. In other words the sliding shutter of the present invention is not merely an addition to the rotating shutter, but serves as an independent means for preventing the entry of light, without, however affecting the exposure duration of the camera. Means are provided according to the invention in order to obtain the different functions of distance with respect to time necessary for the claw and the sliding shutter. According to another characteristic of the invention, the sliding shutter is driven by a coupling mechanism, the driving coupling element of which is linked to the claw eccentric wherein the pivotal connections of this drive are so selected that the stroke of the sliding shutter is longer than the stroke of the film-feeding organ. For this purpose, in the illustrated embodiment, the coupling mechanism driving the sliding shutter comprises a rocking arm 12 pivoted at 12' to the camera housing (not shown). A coupling element 13 is linked to the eccentric with one of its ends and pivoted at 13' to a two-armed lever 14, 15, intermediate the ends of the latter, the lever arm 14 being pivoted to the rocking arm 12 at 14' and the lever arm 15 being pivoted to the sliding shutter 11 at 15'. Thus it will be clear that the sliding shutter will be moved up and down at a greater rate than the claw 5 at the same time.

Inasmuch as the complete covering of the film gate by the sliding shutter is accomplished during the working stroke of the claw, and also the rotating mirror shutter covers the film gate during this time and since, when the camera is at rest, the shutter and the film-feeding mechanism will be arrested by a well known stopping mechanism, the film is protected from any dispersed light rays while the camera is at rest.

It will be apparent to those skilled in the art that many alterations and modifications of the structure illustrated and described can be made without departure from the essence and spirit of the invention which, for that reason, shall not be limited but by the scope of the appended claims.

What we claim is:

1. In a motion picture reflex camera having a film gate, a rotatable shutter with mirror surface movable between an exposure position wherein the rotatable shutter clears the film gate and a film gate covering position, and driven film advancing means including a film engaging member movable through a working stroke wherein said film engaging member engages the film of the camera for advancing it and an idling stroke wherein said film engaging member is disengaged from the film, an additional slidable shutter arranged immediately adjacent and opposite said gate and adapted to reciprocate vertically between said film gate and said rotatable shutter, said additional slidable shutter being movable between a film gate closing position and a film gate clearing position, guiding means arranged between said film gate and said rotatable shutter for reciprocatingly guiding said slidable shutter in front of said film gate between said film gate closing position and said film gate clearing position, coupling means for operatively coupling said additional shutter means to said driven film advancing means and moving said additional shutter means in response to the movements of the film advancing means and at a rate different than said rotatable shutter, said additional shutter means being brought by said film advancing means into said film gate clearing position when said film engaging member starts its idling stroke and said rotatable shutter is still in its film gate covering position, and said additional shutter means being brought into its film gate closing position when said film engaging member moves through its working stroke and said rotatable shutter is again in its film gate covering position, whereby said additional shutter means takes no part in the exposure of the film.

2. In a motion picture reflex camera having a film gate, a rotatable shutter with mirror surface movable between an exposure position and a film gate covering position, and driven film advancing means including a film engaging member movable through a working stroke wherein said film engaging member engages the film of the camera for advancing it and an idling stroke wherein said film engaging member is disengaged from the film, an additional slidable shutter arranged immediately adjacent and opposite said film gate and mounted to vertically reciprocate between said film gate and said rotatable shutter, guiding means arranged between said film gate and said rotatable shutter for reciprocatingly guiding said slidable shutter in front of said film gate between said film gate closing position and said film gate clearing position, a rotatable crank forming part of said film advancing means, coupling means operatively connected to said additional shutter means and said rotatable crank, the coupling points of said coupling means being so selected that the stroke of said additonal shutter means is longer than the stroke of said film engaging element and the additional shutter means is moved into a film gate clearing position when said film engaging member starts its idling stroke and said rotatable shutter is still in its film gate covering position, and the additional shutter means is moved into a film gate closing position when said film engaging member moves through its working stroke and the rottable shutter is again in its film gate covering position.

3. In a motion picture reflex camera having a film gate, a rotatable shutter with mirror surface movable between an exposure position wherein the rotatable shutter clears the film gate and a film gate covering position, and driven film advancing means including a claw, said claw being capable of performing a working stroke wherein said claw engages the film of the camera for advancing it and an idling stroke wherein the claw is disengaged from the film, a sliding shutter slidingly arranged in front of the film gate between the latter and said rotatable shutter, guiding means arranged between said film gate and said rotatable shutter for reciprocatingly guiding said slidable shutter in front of said film gate between said film gate closing position and said film gate clearing position, a rotatable crank forming part of said driven film advancing means, said claw being operatively connected to said crank, and coupling means between the sliding shutter and the crank for moving said sliding shutter in response to the rotation of the crank into a film gate clearing position when the claw starts its sliding stroke and the rotatable shutter is still in its film gate covering position and into a film gate closing position when the claw moves through its working stroke and the rotatable shutter is again in its film gate covering position.

4. In a motion picture reflex camera as claimed in claim 3, said coupling means including a rocking arm one end of which is pivoted to the camera housing, a two-armed lever pivoted to the other end of the rocking arm and pivoted to the sliding shutter, and a coupling element linked to said crank and pivoted to said two-armed lever intermediate the ends of the latter.

5. In a motion picture camera having a rotatable shaft, a rotatable shutter fastened to one end of said shaft, a first gear means mounted on the other end of said shaft, a second gear means in meshed engagement wtih said first gear means, crank means including a crank pin eccentrically fastened to said second gear means, film advancing means operatively connected to said crank means, a film gate situated opposite said rotatable shutter, said rotatable shutter and said film advancing means being so synchronized that said film gate is covered by said rotatable shutter while the film is advanced and cleared by said rotatable shutter while the film is stationary, a slidable shutter spaced from said film gate slidably mounted to reciprocate between a film gate closing position and a film gate clearing position, and means operatively connected to said crank, means for reciprocating said slidable shutter, for guiding said slidable shutter into said film gate clearing position when said film advancing means is starting its idling stroke and said rotatable shutter is still covering said film gate, and for guiding said slidable shutter into said film gate closing position when said film advancing means starts to move through its working stroke.

6. In a motion picture camera according to claim 5, said slidable shutter moving means including a first lever pivotally secured at one end thereof to the upper end of said slidable shutter, a second lever pivotally secured to said first lever at one end thereof and pivotally secured to said crank pin at the other end thereof and a third lever pivotally secured to said first lever at one end thereof and pivotally secured to the camera casing at the other end thereof.

References Cited in the file of this patent

UNITED STATES PATENTS

| | | |
|---|---|---|
| 1,868,331 | Merle | July 19, 1932 |
| 1,991,311 | Barbieri | Feb. 12, 1935 |
| 2,012,352 | Rusting et al. | Aug. 27, 1935 |
| 2,167,713 | Githens et al. | Aug. 1, 1938 |
| 2,343,015 | Lewis | Feb. 29, 1944 |
| 2,506,909 | Vinten | May 9, 1950 |

FOREIGN PATENTS

| | | |
|---|---|---|
| 558,330 | France | May 23, 1923 |
| 442,071 | Germany | June 24, 1927 |
| 942,961 | Germany | Mar. 9, 1956 |

UNITED STATES PATENT OFFICE
CERTIFICATE OF CORRECTION

Patent No. 2,983,185                                                   May 9, 1961

Rudolf Grotzschel et al.

It is hereby certified that error appears in the above numbered patent requiring correction and that the said Letters Patent should read as corrected below.

Column 3, line 52, for "rottable" read -- rotatable --; column 4, line 9, for "sliding" read -- idling --; line 36, after "crank" strike out the comma.

Signed and sealed this 24th day of October 1961.

(SEAL)
Attest:

ERNEST W. SWIDER                                    DAVID L. LADD
Attesting Officer                                       Commissioner of Patents